(12) United States Patent
Strom et al.

(10) Patent No.: US 7,719,792 B2  
(45) Date of Patent: May 18, 2010

(54) METHOD AND APPARATUS INTELLIGENTLY ADAPTING TO ENVIRONMENTAL CONDITIONS INSIDE AND OUTSIDE A HARD DISK DRIVE

(75) Inventors: Brian D. Strom, Cupertino, CA (US); SungChang Lee, San Jose, CA (US); Shuyu Zhang, Fremont, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 783 days.

(21) Appl. No.: 11/698,339

(22) Filed: Jan. 26, 2007

(65) Prior Publication Data
US 2008/0180835 A1   Jul. 31, 2008

(51) Int. Cl.
*G11B 33/14* (2006.01)

(52) U.S. Cl. .................................................. 360/97.02

(58) Field of Classification Search ............. 360/97.01, 360/97.02, 97.03, 97.04
See application file for complete search history.

(56) References Cited

U.S. PATENT DOCUMENTS 6,867,939 B2 *   3/2005   Katahara et al. .............. 360/53

* cited by examiner

*Primary Examiner*—Allen T Cao
(74) *Attorney, Agent, or Firm*—GSS Law Group (57) ABSTRACT

Hard disk drive (HDD) including humidity sensor measuring interior and second humidity sensor measuring exterior with door actuator controlling door for mass transfer between interior and exterior based upon determination of whether or not to transfer. HDD may further include and use temperature sensors for interior and/or exterior to further control door. An embedded circuit and processor at least partly implementing these operations. External cover including door and door actuator, possibly second sensors. Manufacturing methods and these items as their products.

17 Claims, 10 Drawing Sheets

METHOD AND APPARATUS INTELLIGENTLY ADAPTING TO ENVIRONMENTAL CONDITIONS INSIDE AND OUTSIDE A HARD DISK DRIVE

TECHNICAL FIELD

This invention relates to the exchange of air between the interior and exterior of a hard disk drive, in particular to monitoring environmental conditions inside and outside a hard disk drive and controlling air flow between the inside and outside through control of a door between them.

BACKGROUND OF THE INVENTION

It is well known that the reliability of a hard disk drive is affected by both the temperature and humidity inside a hard disk drive. At high temperature and humidity, the slider's air bearing can lose lift, which decreases its flying height and increases the probability of contact between the read-write head and the rotating disk surface. Also, when the temperature decreases rapidly from a high temperature in a very humid situation, water vapor within the hard disk drive may condense on sensitive elements of the hard disk drive, such as the read-write head, slider and/or one or more of the disk surfaces.

The prior art shows several examples of three approaches to minimizing these effects. The first approach is to seal the hard disk drive, so that water vapor leaks in very slowly. A second approach is to include a water absorbent material or desiccant inside the hard disk drive to collect any incoming water vapor, which is thought to maintain internal humidity at a low level. These two approaches do increase the time it takes for the internal water vapor level to rise when such hard disk drives are exposed to environments with high water vapor pressure, where both the temperature and relative humidity are high.

However, there are problems with these approaches. Given enough time in an environment with high water vapor pressure, a hard disk drive using these approaches will be overcome by the abundance of water in its surroundings and what was useful before now makes things worse. For example, should the temperature inside such a hard disk drive rise, the desiccant will now release its stored water into the interior of the hard disk drive, causing the air bearing to lose lift, again, decreasing its flying height and increasing the probability of contact between the read-write head and the disk surface it accesses. Should the inside temperature decrease rapidly, the water vapor will tend to condense because the desiccant has a rate limit of absorption.

There is a third prior art approach, which is to make sure a hard disk drive is not sealed, but supports easy and rapid mass transfer between interior of the hard disk drive and its outside environment. This approach responds quickly to changes in external temperature and humidity, which is useful as the outside temperature and humidity decrease rapidly. However, such hard disk drives run into problems when exposed to high external temperatures and humidity, in that the interior soon has high temperature and humidity, causing the internal water vapor pressure to rise, the slider flying height to decrease and the probability of read-write head contact with a disk surface to increase.

What is needed are mechanisms and operating methods that can readily adapt to changes in the outside environment of a hard disk drive to minimize its interior water vapor pressure.

SUMMARY OF THE INVENTION

Embodiments of a hard disk drive may preferably include a humidity sensor measuring the internal thermal zone of the hard disk drive, a second humidity sensor measuring the exterior of the hard disk drive, and a door between the internal thermal zone and the exterior. The hard disk drive further includes a door control directing a door actuator to open or close the door.

The hard disk drive preferably seeks to maintain the internal water vapor pressure within certain bound to prevent drops in the lift of its air bearings and/or condensation on sensitive parts, such as the read-write heads, the sliders and the disk surfaces. The hard disk drive preferably operates by performing the following:

A humidity reading from the humidity sensor.

A second humidity reading from the second humidity sensor.

An environmental transfer is determined based upon the humidity reading and the second humidity reading.

When the environmental transfer is asserted, then the door control is asserted to open the door through stimulating a door actuator. Opening the door lowers the mass transfer impedance between the interior of the hard disk drive and its exterior. When the hard disk drive is in normal operation, the disks are rotating at several thousand revolutions per minute, which creates a wind off the disks often moving at thirty miles per hour or faster. This wind acts motivate the exchange of air between the interior and the exterior When the environmental transfer is not asserted, then the door control is asserted through the door actuator to shut the door, acting to separate the interior and exterior by increasing the impedance of the mass transfer between these environments.

Determining the environmental transfer may includes one or both of the following:

If the second humidity reading is below the humidity reading, then the environmental transfer is not asserted.

If the second humidity reading is above the humidity reading, then the environmental transfer is asserted.

Embodiments of the hard disk drive may further include a temperature sensor measuring the internal thermal zone of the hard disk drive and/or a second temperature sensor measuring the exterior of the hard disk drive. The hard disk drive may further preferably operate by performing the following:

A temperature reading is received from the temperature sensor as well as the humidity reading from the humidity sensor.

A second temperature reading is second received from the second temperature sensor as well as the second humidity reading from the second humidity sensor.

An environmental transfer may be determined further based upon the temperature reading and/or the second temperature reading.

Determining the environmental transfer may further include one or both of the following:

If the second temperature and the second humidity readings rise or are above a high threshold, then the environmental transfer is not asserted.

If the temperature and the second temperature readings both sharply decrease, then the environmental transfer is asserted.

Embodiments of the hard disk drive may at least partly implement this method as the embedded circuit through the operation of a processor. As used herein, a processor includes at one instance of at least one controller. As used herein, a controller receives at least one input, maintains and updates the value at least one state, and generates at least one output based upon at least one of the inputs and/or the value of at least one of the states. A controller may include a finite state machine, and/or a neural network, and/or an inference engine, and/or a computer accessibly coupled to a memory and at least partly directed by a program system including program steps residing in the memory, and/or an analog component network.

Certain embodiments of the invention include an external cover including the door coupled to the door actuator. The external cover may further include the second temperature sensor and/or the second humidity sensor. The external cover may implement a disk plate for a hard disk drive. The external cover may alternatively implement a disk base.

The door preferably acts to modulate the mass transfer impedance between the interior and exterior of the hard disk drive. Some embodiments of the door may include a valve, and/or a sliding door and/or a hinged door. Any of these doors may cover and/or expose a window, which may preferably be covered by a particle filter. The door actuator may be a solenoid, a piezoelectric drive or another motor, preferably an electrical motor. The door may preferably have a low power or off position. The low power position may preferably be open or closed.

Manufacturing the external cover may include forming the door and coupling the door actuator to the door to create the external cover. Manufacturing the external cover may further include forming the window and bonding the particle filter layer to the window to further create the external cover. Manufacturing may further include mounting the second temperature sensor and/or the second humidity sensor.

Manufacturing an embedded circuit for the hard disk drive may include providing the processor to support this method of operation. Providing the processor may include implementing at least one finite state machine, and/or at least one neural network, and/or at least one inference engine, and/or at least one program step for the program system, and/or implementing at least one analog component network. Implementing a program step in the program system may include writing to a non-volatile memory component of the memory, where a non-volatile memory component retains its memory state without being supplied power and a volatile memory component loses its memory state with a left without power.

Manufacturing the hard disk drive may preferably include coupling the humidity sensor and the second humidity sensor to the embedded circuit and coupling the door actuator to the embedded circuit to create the hard disk drive. In certain embodiments, manufacturing may further include coupling the temperature sensor and/or the second temperature sensor.

These hard disk drives may be used in systems that may preferably employ air conduits coupling to the doors to optimize environmental balancing.

DETAILED DESCRIPTION

This invention relates to the exchange of air between the interior and exterior of a hard disk drive, in particular to monitoring environmental conditions inside and outside a hard disk drive and controlling air flow between the inside and outside through control of a door between them.

Figure 1A:
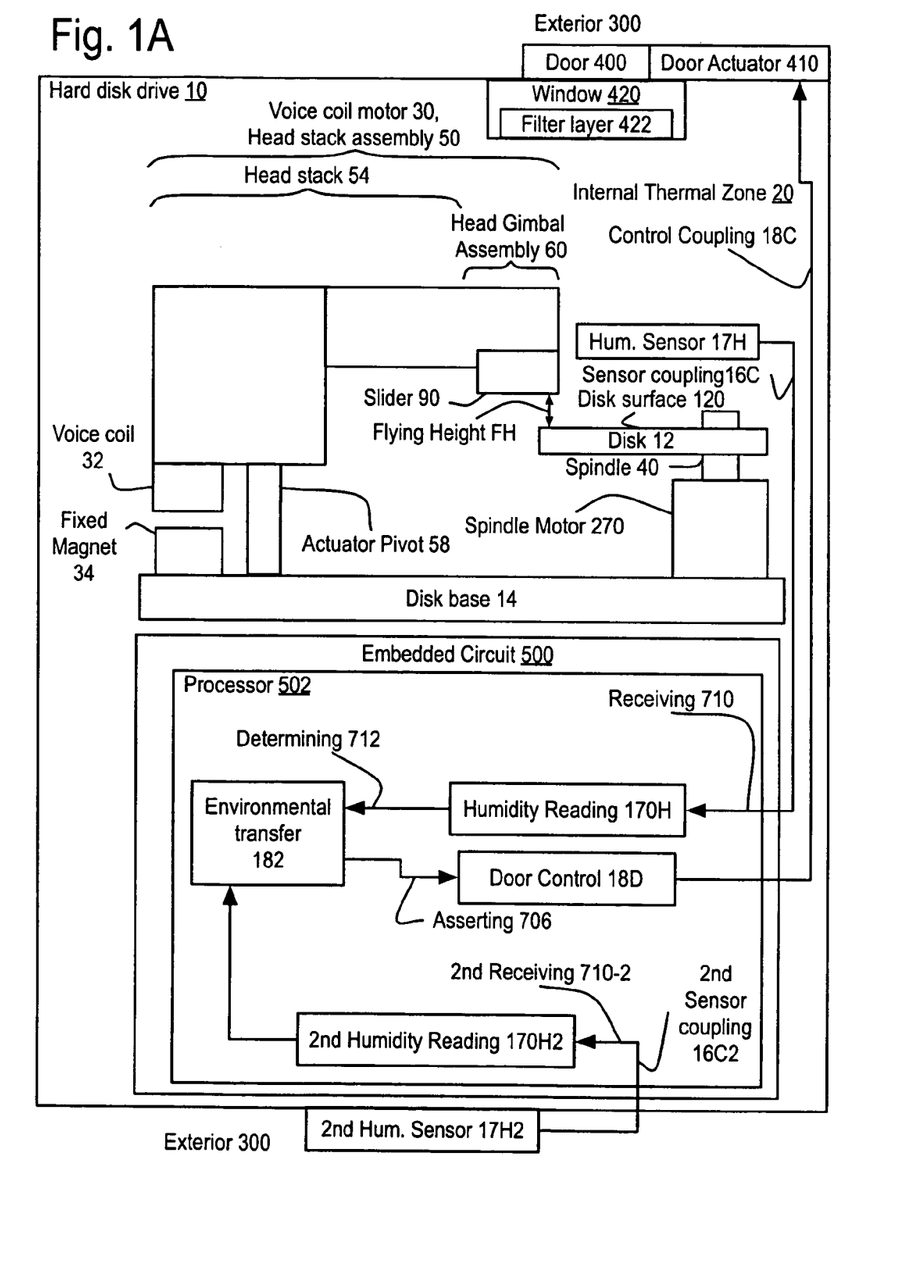
FIG. 1A shows an example of a hard disk drive in accord with the invention and including a humidity sensor measuring an internal thermal zone and a humidity sensor measuring the exterior, an embedded circuit including a processor at least partly directing the operations of the hard disk drive to use a door controlled by a door actuator to modulate the mass transfer of air between the exterior and internal thermal zone.

Embodiments of the hard disk drive 10 may preferably include a humidity sensor 17H measuring the internal thermal zone 20 of the hard disk drive and a second humidity sensor 17H2 measuring the exterior 300 of the hard disk drive, and a door 400 between the internal thermal zone and the exterior as shown in FIG. 1A. The hard disk drive further includes a door control 18D directing a door actuator 410 to open or close the door.

The hard disk drive 10 preferably seeks to maintain the internal water vapor pressure within certain bounds to prevent drops in the lift of its air bearings and/or condensation on sensitive parts, such as the read-write head 94, the slider 90 and the disk surface 120. The hard disk drive preferably operates by performing the following:

- A humidity reading 170H is received 710 from the humidity sensor 17H.
- A second humidity reading 170H2 is second received 710-2 from the second humidity sensor 17H2.
- An environmental transfer 182 may further be determined 712 based upon the humidity reading and the second humidity reading.
- When the environmental transfer 182 is asserted, then the door control 18D is asserted to open the door 400 through stimulating a door actuator 410. Opening the door lowers the mass transfer impedance between the interior, represented herein as the internal thermal zone 20 of the hard disk drive 10 and its exterior 300. When the hard disk drive is in normal operation, the disk 12 rotates at several thousand revolutions per minute, which creates a wind often moving at thirty miles per hour or faster. This wind acts motivate the exchange of air between the internal thermal zone and the exterior.
- When the environmental transfer 182 is not asserted, then the door control 18D is asserted through the door actuator 410 to shut the door 400, acting to separate the internal thermal zone 20 and exterior 300 by increasing the impedance of the mass transfer between these environments.

Figure 1B:
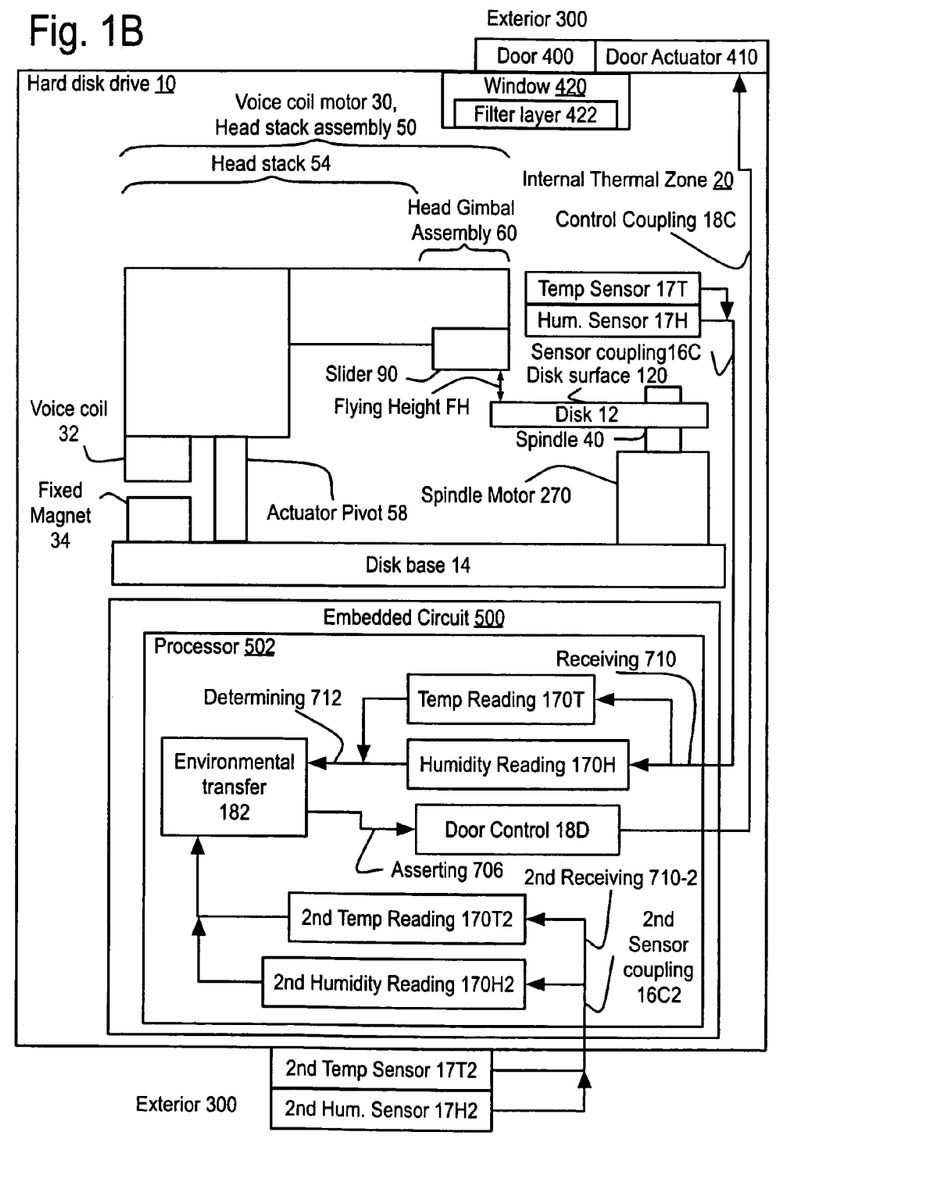
FIG. 1B shows an example of a refinement to the hard disk drive of FIG. 1A including a temperature sensor measuring an internal thermal zone and/or a second temperature sensor measuring the exterior.

Embodiments of the hard disk drive 10 may further include a temperature sensor 17T measuring the internal thermal zone 20 of the hard disk drive and a second temperature sensor 17T2 measuring the exterior 300 of the hard disk drive as shown in FIG. 1B. The hard disk drive may further operates by performing the following:

- The temperature reading 170T is received 710 from the temperature sensor 17T and the humidity reading 170H from the humidity sensor 17H.
- The second temperature reading 170T2 is second received 710-2 from the second temperature sensor 17T2 and a second humidity reading 170H2 from the second humidity sensor 17H2.
- An environmental transfer 182 may further be determined 712 based upon the temperature reading and/or the second temperature reading.
- The temperature sensor 17T and/or the second temperature sensor 17T2 may use a thermistor.

Embodiments of the hard disk drive 10 may at least partly implement this method as the embedded circuit 500 through the operation of a processor 502. As used herein, a processor includes at one instance 504 of at least one controller 506, as shown in FIG. 2A.

As used herein, a controller 506 receives at least one input 506In, maintains and updates the value at least one state 506S, and generates at least one output 506Out based upon at least one of the inputs and/or the value of at least one of the states.

Figures 2A, 2B, 2C:
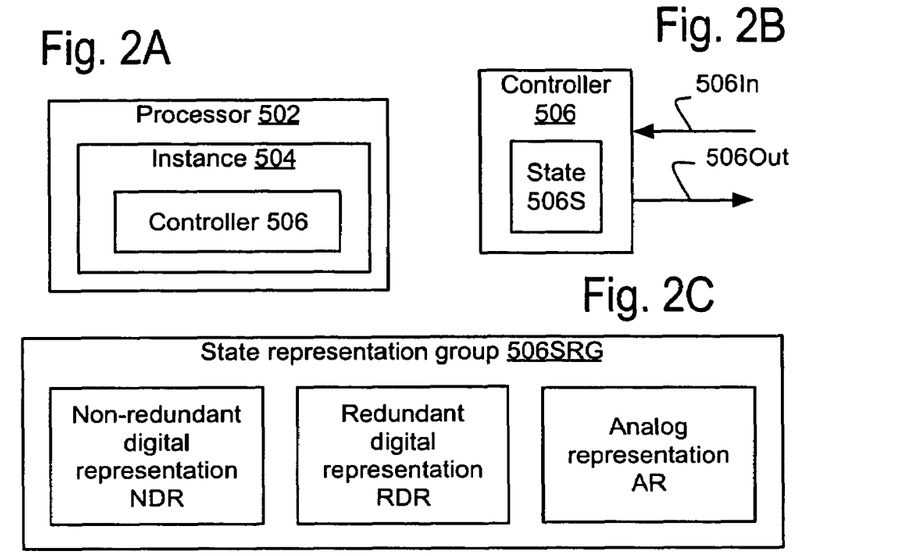
FIG. 2A shows the processor of FIGS 1A and/or 1B including at least one instance of a controller.
FIG. 2B shows the controller of FIG. 2A receiving at least one input, maintaining and updating the value of at least one state and generating at least one output based upon at least one of the inputs and/or the value of at least one of the states.
FIGS. 2C and 2D show some details regarding the values of the states of FIG. 2B.

At least one state 506S may have a value including at least one member of the state representation group 506SRG consisting of the members: a non-redundant digital representation NDR and/or a redundant digital representation RDR and/or an analog representation AR, as shown in FIG. 2C. A non-redundant digital representation frequently comprises at least one digit, which may frequently represent a bit with values of 0 and 1, a byte including eight bits, and so on. Often non-redundant digital representations include representations of 16 bit integers, 32 bit integers, 16 bit floating point numbers, 32 bit floating point numbers, 64 bit floating point numbers, strings of bytes, fixed length buffers of bytes, integers, First-In-First-Out (FIFO) queues of such representations, and so on. Any, all and more than just these examples may be used as non-redundant digital representations of the state of a controller.

Figure 2D:
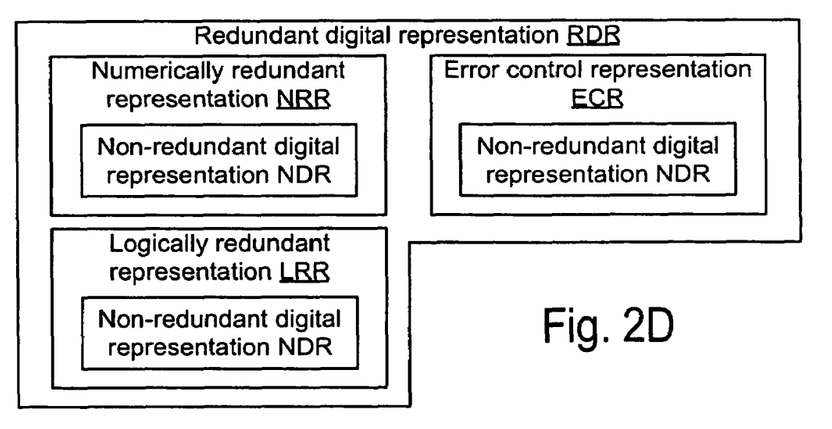

A redundant digital representation RDR of a non-redundant digital representation NDR may include a numerically redundant digital representation NRR, an error control representation ECR and/or a logically redundant representation LRR, as shown in FIG. 2D. The following examples will serve to illustrate these redundant representations:

- An example of a numerically redundant representation NRR may be found in a standard multiplier, which will often use a local carry propagate adder to add three or four numbers together to generate two numeric components which redundantly represent the numeric result of the addition.
- An example of an error control representation ECR will frequently use the non-redundant digital representation and an additional component formed as the function of the non-redundant digital representation. If this error control representation is altered by a few numbers of bits, an error correcting function reconstructs the original non-redundant digital representation. Quantum computers are considered as controllers which will tend to use this kind of error control representations for at least some states.
- An example of a logically redundant representation LRR may be found in the definition and implementation of many finite state machines, which often require that a single state be represented by any member of a multi-element set of non-redundant digital representation. Often the members of this set differ from at least one other member of the set by just one bit. Such logically redundant representations are often used to insure that the generation of glitches is minimized.

Figure 2E:
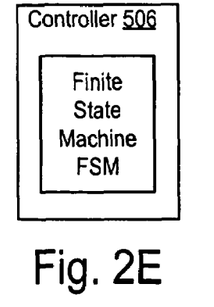
FIG. 2E shows the controller of FIGS. 2A and 2B including at least one instance of a finite state machine.
Figure 2F:
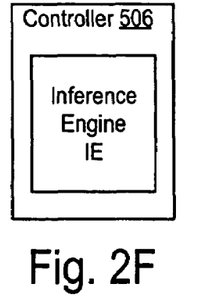
FIG. 2F shows the controller of FIGS. 2A and 2B including at least one instance of an inference engine.
Figure 2G:
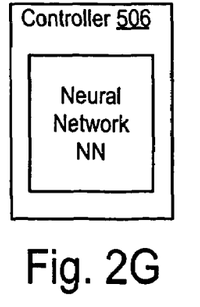
FIG. 2G shows the controller of FIGS. 2A and 2B including at least one instance of a neural network.
Figure 2H:
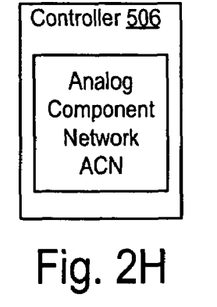
FIG. 2H shows the controller of FIGS. 2A and 2B including at least one instance of an analog component network.
Figure 3A:
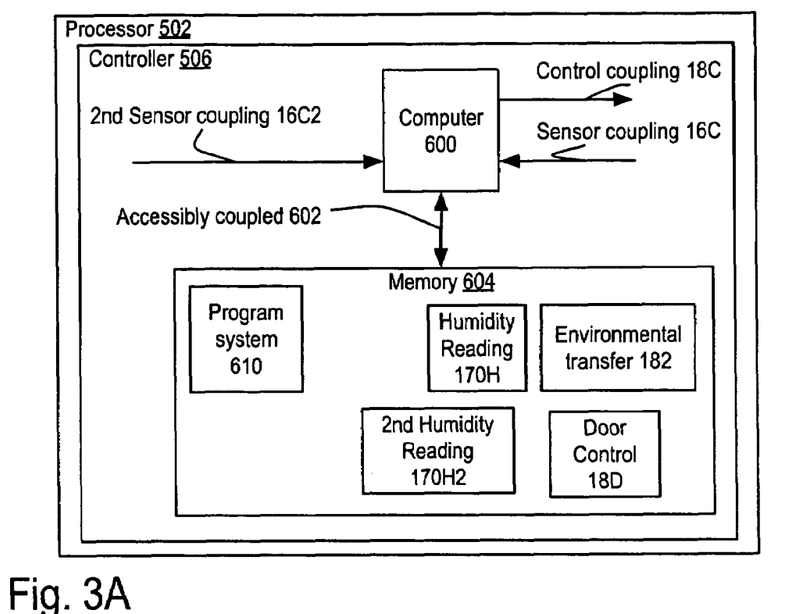
FIG. 3A shows the controller of FIGS. 2A and 2B, and in this example, the processor of FIG. 1A, including at least one instance of a computer accessibly coupled via a buss to a memory and at least partly directed by a program system.
Figure 3B:
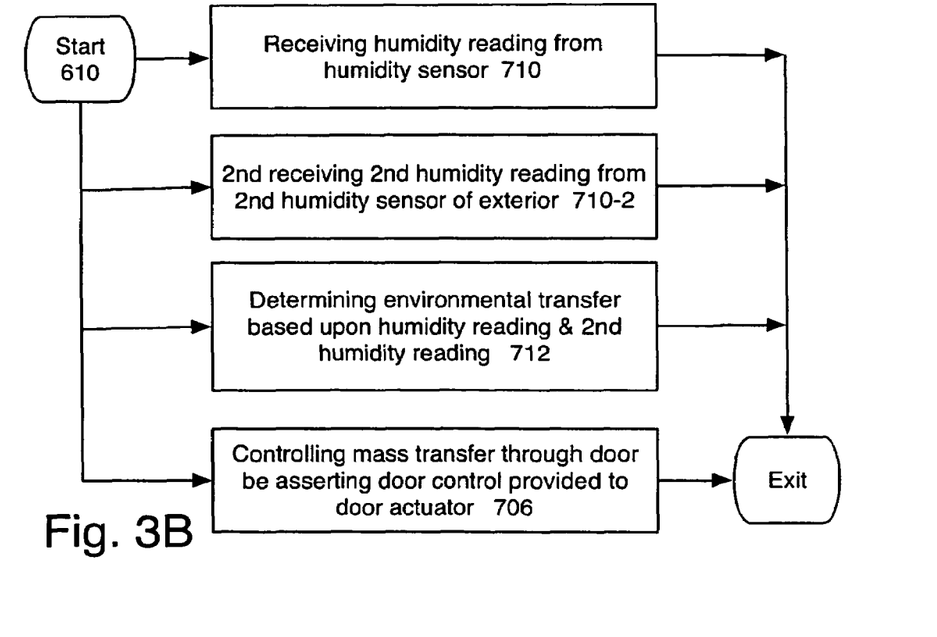
FIGS. 3B and 4A shows flowchart of the program system of FIG. 3A at least partly implementing the method of operating the hard disk drive of FIG. 1A.
Figure 3C:
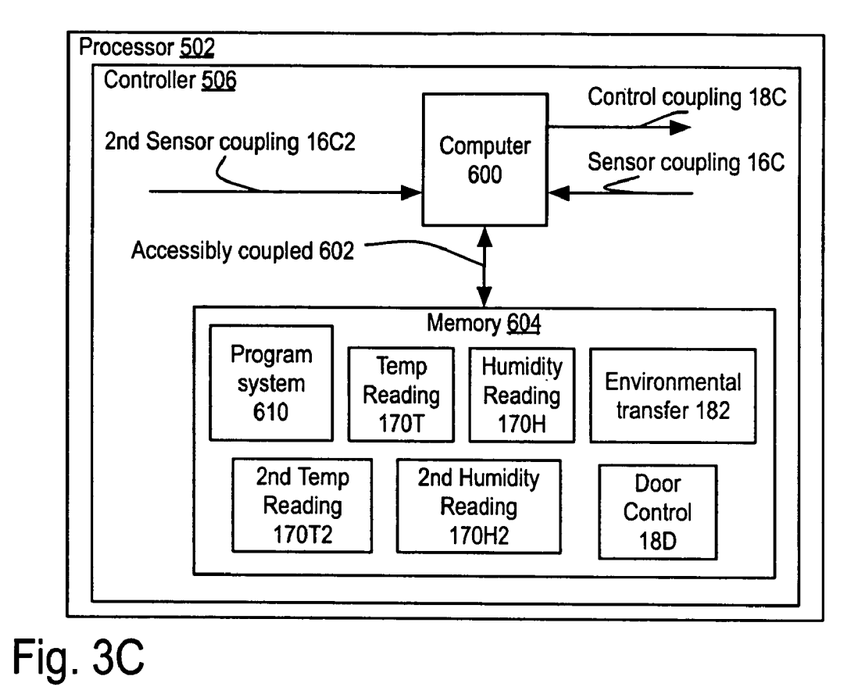
FIG. 3C shows a refinement of FIG. 3A supporting the example of the hard disk drive of FIG. 1B.

As used herein, the controller 506 may include an instance of a finite state machine FSM as shown in FIG. 2E, and/or include an instance of an inference engine IE as shown in FIG. 2F and/or an instance of a neural network NN as shown in Figure GG and/or an instance of an analog component network ACN, and/or an instance of a computer 600 directed by a program system 610 including program steps residing in a memory 604 accessibly coupled 602 via a buss to the computer as shown in FIGS. 3A and 3C. As used herein, a computer includes at least one instruction processor and at least one data processor, where each of the data processors is directed by at least one of the instruction processors.

A controller 506 may include any combination of instances of a finite state machine FSM, and/or a neural network NN, and/or an inference engine IE, and/or an analog component network ACN and/or a computer 600 accessibly coupled 602 to a memory 604 preferably via a buss and at least partly directed by a program system 610 including program steps residing in the memory.

Several Figures show flowcharts of various aspects and/or details of these methods and possess arrows. These arrows will signify of flow of control and sometimes data, supporting implementations including at least one program step or program thread executing upon a computer 600, inferential links in an inference engine IE, state transitions in a finite state machine FSM, and learned responses within a neural network NN.

The operation of starting a flowchart refers to at least one of the following and is denoted by an oval with the text "Start" in it: Entering a subroutine in a macro instruction sequence in a computer 600. Entering into a deeper node of an inferential graph of an inference engine IE. Directing a state transition in a finite state machine FSM, possibly while pushing a return state. And triggering at least one neuron in a neural network NN.

The operation of termination in a flowchart refers to at least one of the following and is denoted by an oval with the text "Exit" in it: The completion of those steps, which may result in a subroutine return in a computer 600. Traversal of a higher node in an inferential graph of an inference engine IE. Popping of a previously stored state in a finite state machine FSM. Return to dormancy of the firing neurons of the neural network NN.

An operation in a flowchart refers to at least one of the following: The instruction processor responds to the step as a program step to control the data execution unit in at least partly implementing the step within a computer 600. The inference engine IE responds to the step as nodes and transitions within an inferential graph based upon and modifying a inference database in at least partly implementing the step. The neural network NN responds to the step as stimulus in at least partly implementing the step. The finite state machine FSM responds to the step as at least one member of a finite state collection comprising a state and a state transition, implementing at least part of the step.

The method of operating the hard disk drive 10 of FIG. 1A may be further embodied as a refinement of the program system 610 of FIG. 3A, which may preferably include at least one of the steps shown in FIG. 3B:
  Receiving 710 the humidity reading 170H from the humidity sensor 17H.
  Second receiving 710-2 the second humidity reading 170H2 from the second humidity sensor 17H2.
  Determining 712 the environmental transfer 182 based upon the humidity reading and the second humidity reading.
  And controlling the mass transfer through the door 400 by asserting 706 the door control 18D based upon the environmental transfer and provided to the door actuator 410.

Figure 4A:
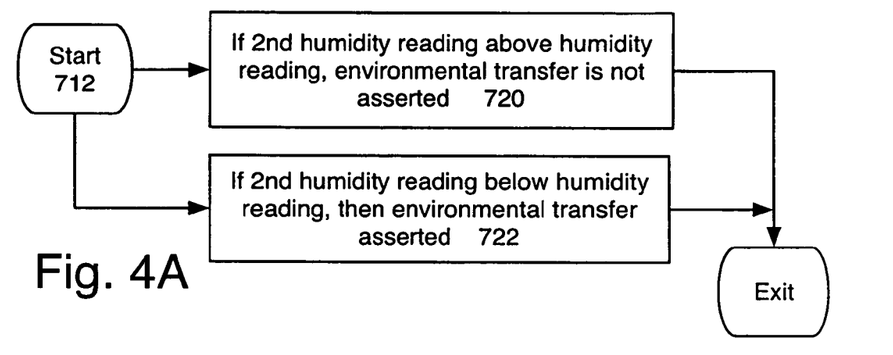

Determining 712 the environmental transfer 182 of FIG. 1A and 3B may further include at least one of the steps of FIG. 4A:
  Step 720 supports determining if the second humidity reading 170H2 is above the humidity reading 170H, then the environmental transfer is un-asserted.
  Step 722 supports determining if the second humidity reading is below the humidity reading, then the environmental transfer is asserted.

Figure 3D:
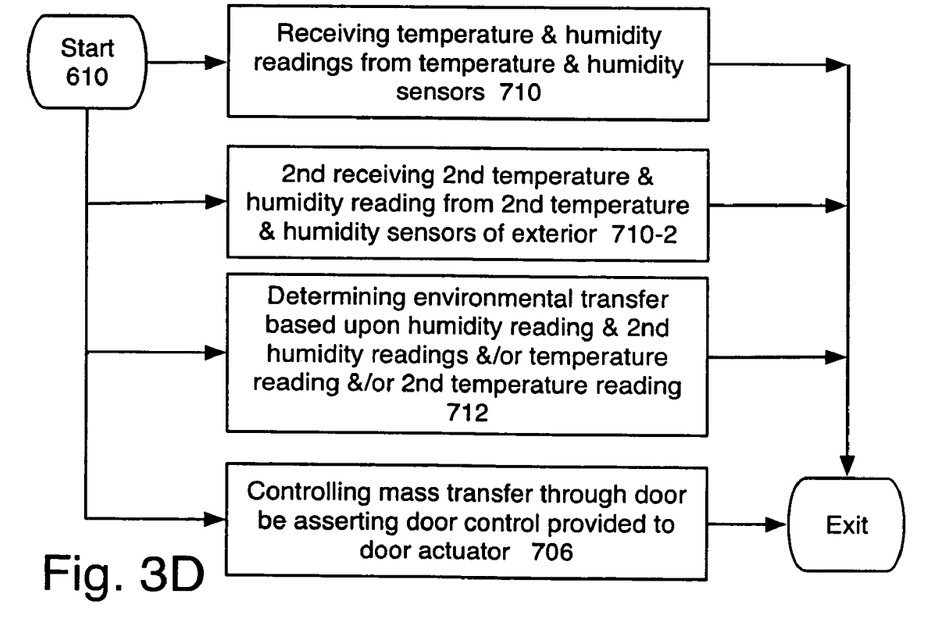
FIGS. 3D and 4D shows flowchart of the program system of FIG. 3C at least partly implementing the method of operating the hard disk drive of FIG. 1B.

The method of operating the hard disk drive 10 of FIG. 1B may be embodied as the program system 610 of FIG. 3C, which may preferably include at least one of the steps shown in FIG. 3D:
  Receiving 710 the humidity reading 170H from the humidity sensor 17H and the temperature reading 170T from the temperature sensor 17T.
  Second receiving 710-2 the second humidity reading 170H2 from the second humidity sensor 17H2 and the second temperature reading 170T2 from the second temperature sensor 17T2.
  Determining 712 the environmental transfer 182 based upon the humidity reading and the second humidity reading and at least one of the temperature reading and/or the second temperature reading.
  And controlling the mass transfer through the door 400 by asserting 706 the door control 18D based upon the environmental transfer and provided to the door actuator 410.

Figure 4B:
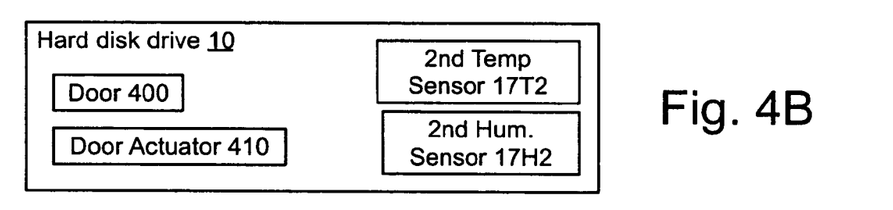
FIG. 4B shows the hard disk drive including an external cover which includes the door, the door actuator, the second temperature sensor and the second humidity sensor.
Figure 4C:
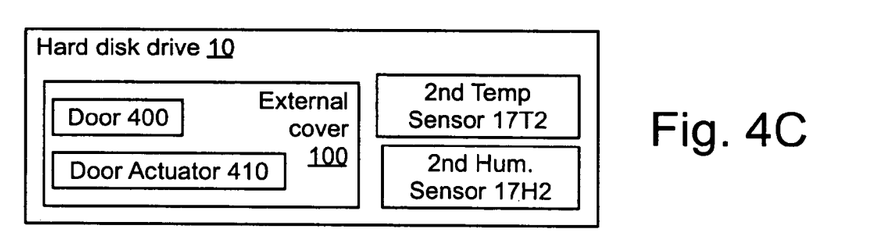
FIG. 4C shows the hard disk drive including the external cover distinct from the second temperature sensor and the second humidity sensor.
Figure 4D:
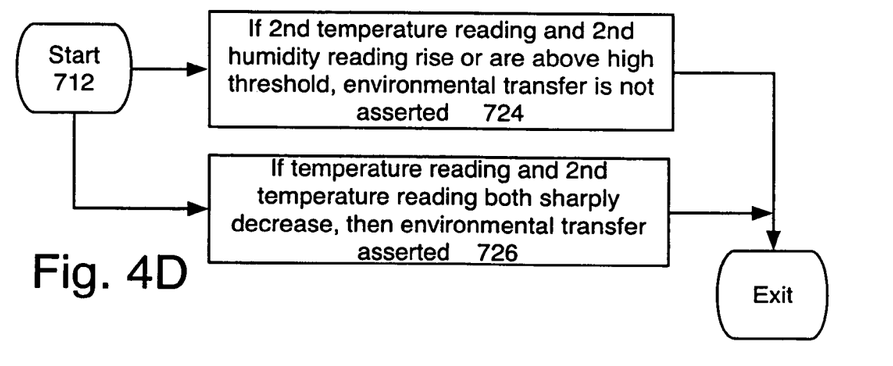

Determining 712 the environmental transfer 182 of FIG. 1B and 3D may further include at least one of the steps of FIG. 4D:
  Step 724 supports determining if the second temperature reading 170T2 and the second humidity reading 170H2 rise or are above a high threshold, then the environmental transfer is un-asserted.
  Step 726 supports determining if the temperature reading 170T and the second temperature 170T2 both sharply decrease, then the environmental transfer is asserted.

Figure 5A:
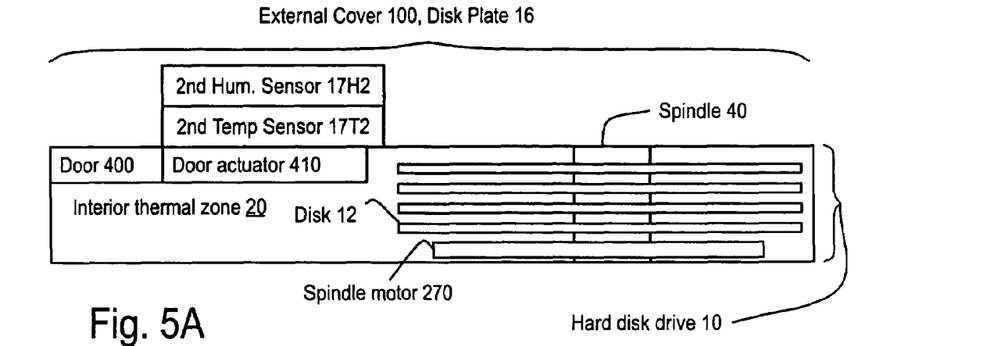
FIG. 5A shows the hard disk drive including the external cover as a disk plate.
Figure 5B:
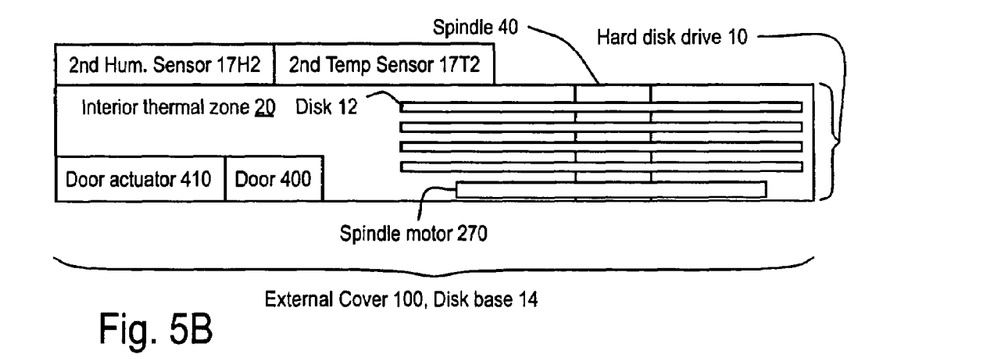
FIG. 5B shows an example of the hard disk drive of FIG. 1B with the door mounted on a sidewall of the external cover as a disk base.
Figure 5C:
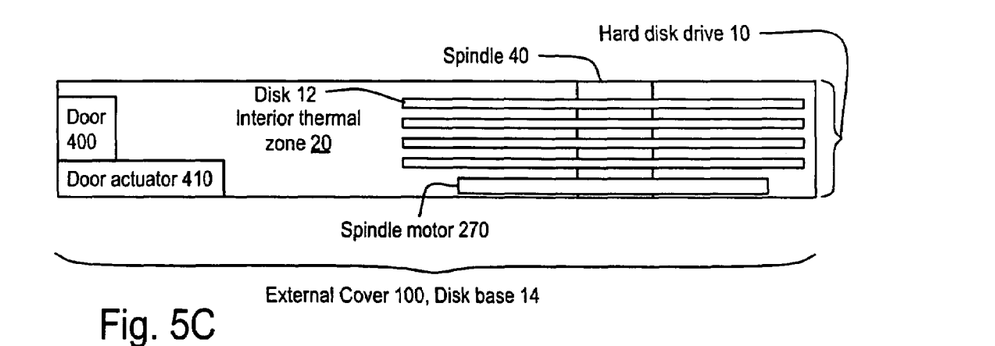
FIG. 5C shows another example of the hard disk drive of FIG. 1B with the external cover as the disk base.
Figure 8A:
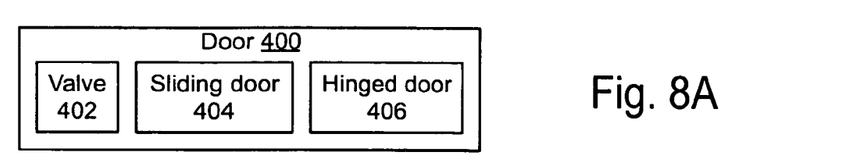
FIG. 8A shows the door may include a valve, a sliding door, and/or a hinged door.
Figure 8B:
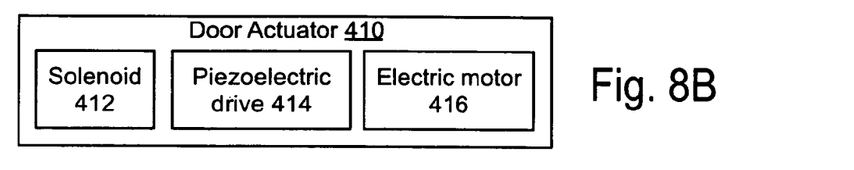
FIG. 8B shows the door actuator may include a solenoid, a piezoelectric device, and/or an electric motor.
Figure 8C:
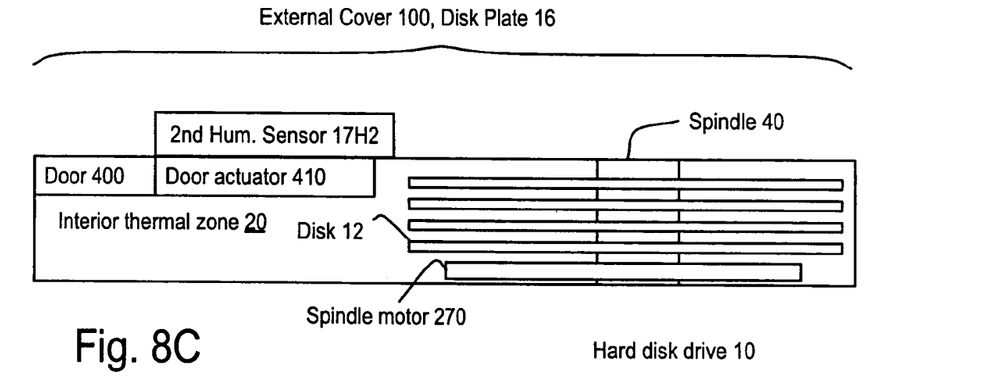
FIG. 8C shows an example of the hard disk drive of FIG. 1A with the door mounted on a sidewall of the external cover as a disk base.
Figure 8D:
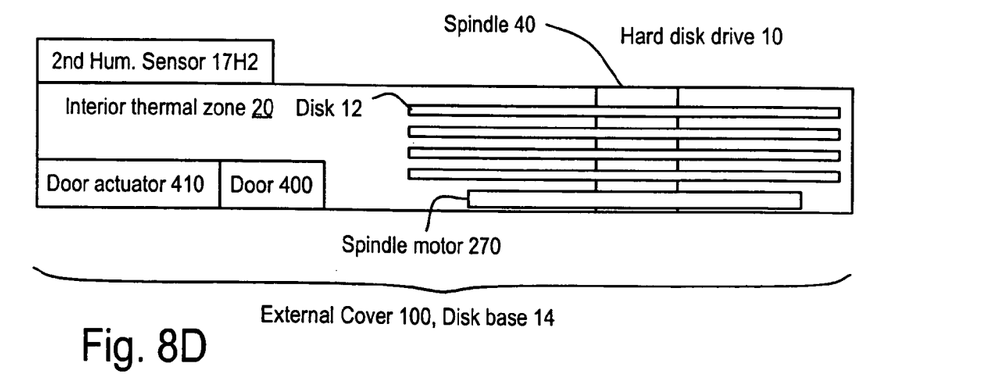
FIG. 8D shows another example of the hard disk drive of FIG. 1A with the external cover as the disk base.

Certain embodiments of the invention include an external cover 100 including the door 400 coupled to the door actuator 410 as shown in FIGS. 4B, 4C, 5A to 5C, 8C and 8D. The external cover may further include the second temperature sensor 17T2 and/or the second humidity sensor 17H2 as shown in FIGS. 4B, 5A and 8C. The external cover may implement a disk plate 16 for a hard disk drive 10 as shown in FIGS. 5A and 8C. The external cover may alternatively implement a disk base 14 as shown in FIGS. 5C and 8D.

The door 400 preferably acts to modulate the mass transfer impedance between the internal thermal zone 20 and exterior 300 of the hard disk drive 10. Some embodiments of the door may include a valve 402, and/or a sliding door 404 and/or a hinged door 406 as shown in FIG. 8A. Any of these doors may cover and/or expose a window 420, which may preferably be covered by a particle filter 422 as shown in FIGS. 1A and 1B. The door actuator 410 may be a solenoid 412, a piezoelectric drive 414 or another motor, preferably an electrical motor 416, as shown in FIG. 8B. The door may preferably have a low power or off position. The low power position may preferably be open or closed.

The internal thermal zone may further be considered as the interior of the hard disk drive, with a focus on the read-write head 90 of each slider 60 and the rotating disk surface 120 it accesses.

Manufacturing the external cover 100 may include forming the door 400 and coupling the door actuator 410 to the door to create the external cover. Manufacturing the external cover may further include forming the window 420 and bonding the filter layer 422 to the window to further create the external cover. Manufacturing may further include mounting the second temperature sensor 17T2 and/or the second humidity sensor 17H2. The external cover is a product of this manufacturing process.

Manufacturing an embedded circuit 500 for the hard disk drive 10 may include providing the processor 502 to support this method of operation. Providing the processor may include implementing at least one finite state machine FSM, and/or at least one neural network NN, and/or at least one inference engine IE, and/or at least one program step for the program system 610, and/or implementing at least one analog component network. Implementing a program step in the program system may include writing to a non-volatile memory component of the memory 604, where a non-volatile memory component retains its memory state without being supplied power and a volatile memory component loses its memory state with left without power. The embedded circuit is a product of this manufacturing process.

Manufacturing the hard disk drive 10 shown in FIG. 1A may preferably include coupling the humidity sensor 17H and the second humidity sensor 17H2 to the embedded circuit 500 and coupling the door actuator 410 to the embedded circuit to create the hard disk drive. Manufacturing the hard disk drive 10 shown in FIG. 1B may further include coupling the temperature sensor 17T and the second temperature sensor 17T2 to the embedded circuit. The hard disk drive is a product of this process.

Figure 7:
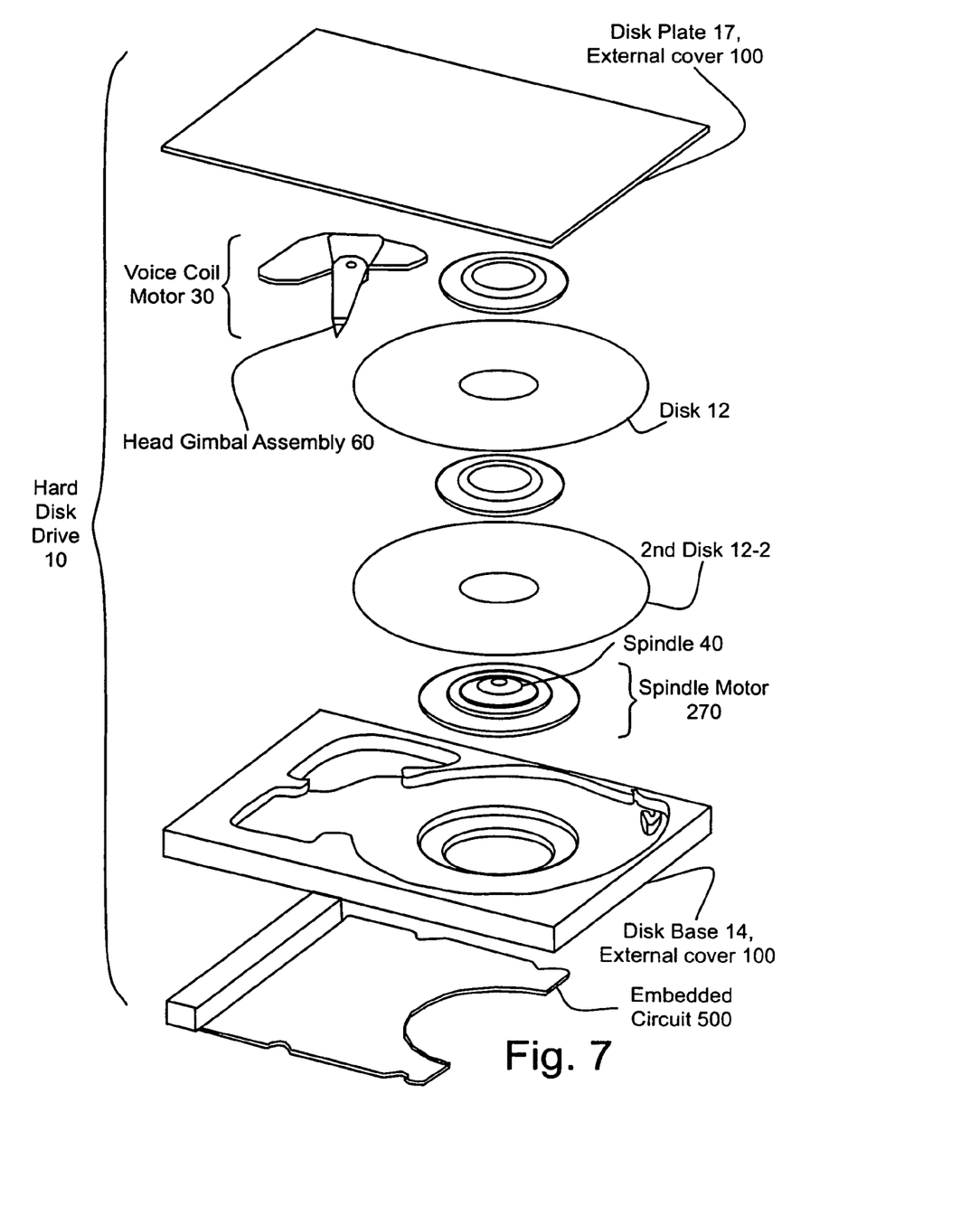
FIG. 7 shows an exploded view of the hard disk drive in accord with the invention.

In further detail, the hard disk drive 10 may include the head stack assembly 50 pivotably mounted through its actuator pivot 58 to a disk base 14 including at least one disk 12 rotatably coupled through a spindle 40 to a spindle motor 270 also mounted to the disk base. The hard disk drive may employ a Contact Start-Stop (CSS) parking mechanism for the slider 90 on the disk surface 120 or employ a ramp parking mechanism for the slider off the disk surface.

In normal operation the head stack assembly 50 pivots through an actuator pivot 58 to position at least one read-write head 94, embedded in a slider 90, over a rotating disk surface 120. The data stored on the rotating disk surface is typically arranged in concentric tracks. To access the data of a track, the read-write head is positioned by electrically stimulating the voice coil motor 30, which couples through the voice coil 32 and an actuator arm 52 to move a head gimbal assembly 60 in lateral positioning the slider close to the track. Once the read-write head is close to the track, the embedded circuit 500 typically enters an operational mode known herein as track following. It is during track following mode that the read-write head is used to access the data stored of the track.

The hard disk drive 10 further includes a head stack assembly 50 containing at least one head gimbal assembly 60 coupled to a head stack 54 through at least one actuator arm 52. A head stack assembly may include more than one head gimbal assembly coupled to the head stack and as many as two head gimbal assemblies coupling through an actuator arm. The voice coil motor 30 is usually considered to include the voice coil 32 coupled to the head stack assembly 50.

Figure 6A:
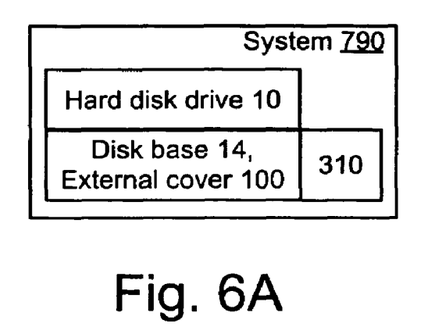
FIGS. 6A to 6D show various examples of a system providing at least one air conduit to the door of at least one of the hard disk drives of FIGS 1A and 1B.
Figure 6B:
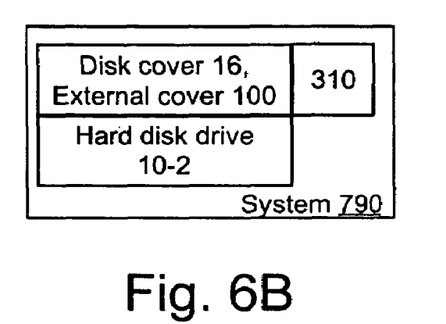
Figure 6C:
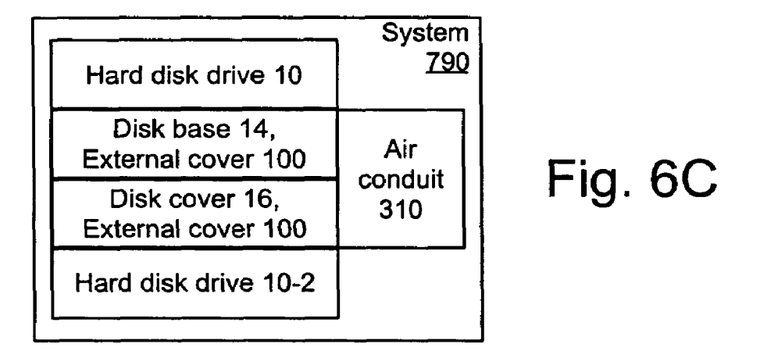
Figure 6D:
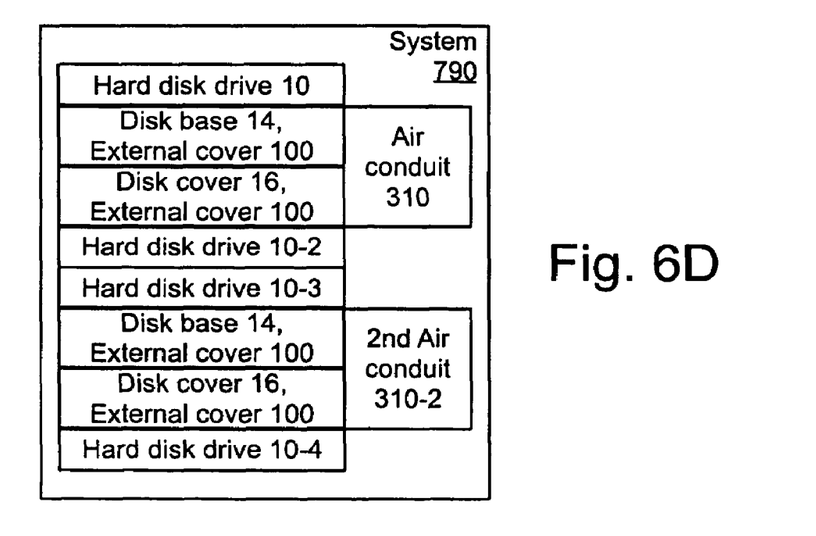

These hard disk drives may be used in a system 790 that may preferably employ at least one air conduit 310 coupling to at least one door of the hard disk drive 10 to optimize environmental balancing. For example, FIG. 6A show the system coupling the hard disk drive 10 through the external cover 100 as the disk base 14 to the air conduit. FIG. 6B shows coupling through the external cover as the disk cover 16 to the air conduit. FIGS. 6C and 6D show some variations for the system further including a second hard disk drive 10-2. The system may further include more than one air conduit, for example, a second air conduit 310-2 as shown in FIG. 6D, which couples to the door of the disk base of the third hard disk drive 10-3 and the fourth hard disk drive 10-4.

Various systems may couple an air conduit 310 to a disk base 14 of one hard disk drive 10 and to a disk cover 16 of a second hard disk drive 10-2 as in FIGS. 6C and 6D. Alternatively, as shown in FIG. 6D, a second air conduit 310-2 may be coupled to the disk cover of a third hard disk drive 10-3 and the disk cover of a fourth hard disk drive 10-4.

The preceding embodiments provide examples of the invention and are not meant to constrain the scope of the following claims.

What is claimed is:

1. A hard disk drive, comprising:
   a humidity sensor for measuring an internal thermal zone;
   a second humidity sensor for measuring an exterior of said hard disk drive;
   a door between said internal thermal zone and said exterior controlled by a door actuator through a door control;
   wherein said door control directs said door actuator to close said door when an environmental transfer is un-asserted; and
   wherein said door control directs said door actuator to open said door when said environmental transfer is asserted;
   wherein said environmental transfer is determined based upon said humidity reading and said second humidity reading.

2. The hard disk drive of claim 1, further comprising at least one member of the group consisting of: a temperature sensor for measuring said internal thermal zone;
   a second temperature sensor for measuring said exterior of said hard disk drive;
   wherein said environmental transfer is determined based upon at least one of the members of the group consisting of: said temperature reading and said second temperature reading.

3. A method of operating said hard disk drive of claim 1, comprising the steps of:
   receiving said humidity reading from said humidity sensor;
   second receiving said second humidity reading from said second humidity sensor;
   determining said environmental transfer based upon said humidity reading and said second humidity reading; and
   controlling said mass transfer through said door by asserting said door control based upon said environmental transfer and provided to said door actuator.

4. The method of claim 3, said hard disk drive further comprises at least one member of the group consisting of: a temperature sensor for measuring said internal thermal zone;
   wherein the step receiving, further comprises the step:
   receiving said temperature reading from said temperature sensor and said humidity reading from said humidity sensor;
   wherein the step second receiving, further comprises the step:
   second receiving said second temperature reading from said second temperature sensor and said second humidity reading from said second humidity sensor;
   wherein the step determining, further comprises the step:
   determining said environmental transfer based upon at least one member of the group consisting of: said temperature reading and said second humidity reading.

5. The method of claim 4, wherein the step of determining further comprises at least one member of the group consisting of the steps of:
   determining if the second temperature reading and the second humidity reading rise or are above a threshold, then said environmental transfer is un-asserted; and
   determining if the temperature reading and the second temperature both sharply decrease, then said environmental transfer is asserted.

6. An embedded circuit for directing said hard disk drive to at least partly implement the method of claim 3, comprising:
   a processor receiving said temperature reading from said temperature sensor and said humidity reading from said humidity sensor via a sensor coupling;
   said processor second receiving said second temperature reading from said second temperature sensor and said second humidity reading from said second humidity sensor via a second sensor coupling;
   said processor determining said environmental transfer based upon said humidity reading and said second humidity reading; and
   said processor asserting a door control based upon said environmental transfer to stimulate said door actuator via a control coupling.

7. The embedded circuit of claim 6, wherein said processor includes at least one instance of a controller; wherein each of said controller receives at least one input, maintains and updates the value of at least one state, and generates at least one output based upon at least one member of the group consisting of: said inputs and the value of said states.

8. The embedded circuit of claim 7, wherein said controller comprises at least one instance of at least one member of the group consisting of: a finite state machine, a neural network, an inference engine, an analog component network, and a computer accessibly coupled to a memory and at least partly directed by a program system including at least one program step residing in said memory;

wherein said computer includes at least one data processor and at least one instruction processor; wherein each of said data processors is at least partly directed by at least one of said instruction processors.

9. The hard disk drive of claim 1, wherein said door actuator comprises at least one member of the group consisting of: a solenoid, a piezoelectric drive, and an electric motor.

10. The hard disk drive of claim 1, wherein said door comprises at least one member of the group consisting of: a valve, a sliding door and a hinged door.

11. The hard disk drive of claim 10, wherein said door couples to a window to modulate the impedance of mass transfer between said internal thermal zone and said exterior.

12. The hard disk drive of claim 11, wherein said window includes a filter layer.

13. An external cover for use in said hard disk drive of claim 1, comprising: said door coupled to said door actuator.

14. The external cover of claim 13, further comprising at least one member of the group consisting of: a second temperature sensor and said second humidity sensor.

15. The external cover of claim 13, wherein said external cover provides a member of the group consisting of: a disk base and a disk plate.

16. A method of manufacture of at least one member of a product group, consisting of: said external cover of claim 13, an embedded circuit; a processor, said hard disk drive;

wherein said method comprises at least one step in the group consisting of:

forming said door coupled to said door actuator to create said external cover;

providing said processor to at least partly implement said method of operating to create said embedded circuit; and coupling said embedded circuit to said temperature sensor, said humidity sensor, said second temperature sensor, said second humidity sensor, and said door actuator to create said hard disk drive.

17. The members of said product group as the products of the process of claim 16.

* * * * *